June 23, 1970 R. F. NORTON ET AL 3,517,184
CLAMP FOR TELESCOPING SHAFT
Filed May 4, 1967
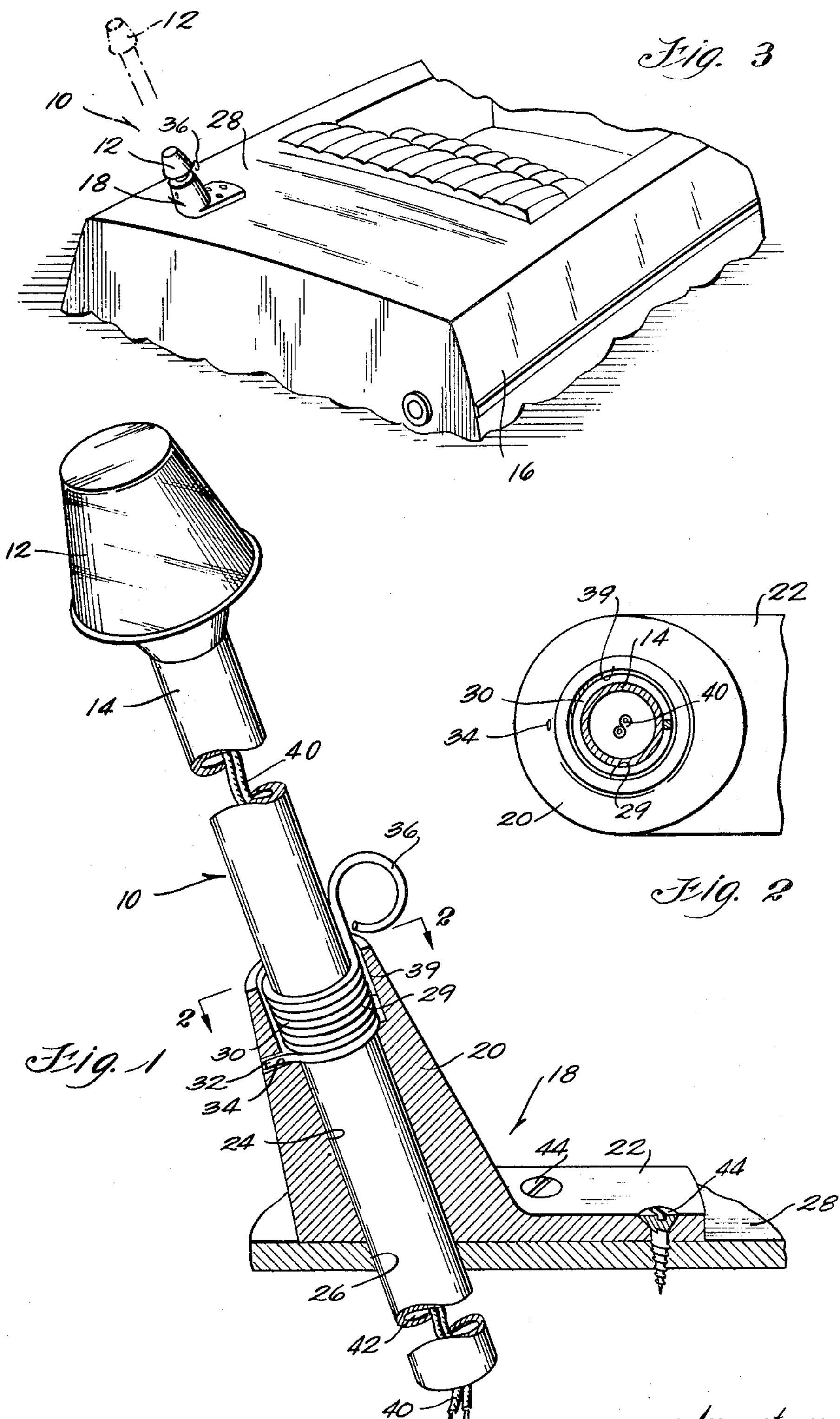
Inventors
Raymond F. Norton
Gordon B. Hale
BY
Wheeler, Wheeler, House & Clemency
Attorneys United States Patent Office 3,517,184
Patented June 23, 1970

3,517,184
CLAMP FOR TELESCOPING SHAFT

Raymond F. Norton and Gordon B. Hale, Waukegan, Ill., assignors to Outboard Marine Corporation, Waukegan, Ill., a corporation of Delaware Filed May 4, 1967, Ser. No. 636,177
Int. Cl. B63b *45/04;* E21d *15/14*
U.S. Cl. 240—7.5 4 Claims

ABSTRACT OF THE DISCLOSURE

A retainer or clamp for use with a shaft to adjustably secure the shaft at various distances from the retainer. The clamp is used in a boat light mounting bracket to afford vertical height adjustment of the boat light shaft. The boat light shaft telescopes through a bore in a mounting bracket which is secured to a boat hull. Vertical height adjustment of the shaft is afforded by a coil spring which is principally located within the bore and which is arranged around the shaft. The spring is of a diameter slightly less than the diameter of the shaft and thus clamps on the shaft and secures the boat light at the desired height. A change in height of the boat light is effectuated by grasping a finger grip at one end of the spring and unwinding the spring to increase its diameter.

SUMMARY OF INVENTION

This invention relates to a retainer or clamp for a telescoping shaft which is particularly adapted for use with a vertically adjustable boat light. The clamp affords selective height adjustment of the boat light relative to the boat hull. The boat light in which the clamp is embodied includes a lens and bulb mounted at one end of a saft, and a mounting bracket which has an upstanding boss with a more which telescopically receives the boat light shaft. The boss has a counterbore of slightly larger diameter than the bore. Located within the counterbore is a helical coil spring having one end secured in a radial aperture and a free end extending above the boss. The free end is provided with a finger grip for manual manipulation. The spring is manufactured with an inside diameter somewhat less than the diameter of the light shaft and thus, is normally in clamping engagement with the light shaft when the spring is assembled around the shaft, thereby preventing axial shaft movement.

A change in height of the light shaft is effectuated by grasping the spring finger grip and unwinding the spring by circumferential movement of the finger grip to increase the radial dimension of the spring and release the clamping engagement of the spring on the shaft. When the boat light and sahft are positioned at the desired height, the finger grip is released and the spring returns to a clamping engagement on the shaft. The counterbore in the boss is slightly larger in diameter than the spring, thus permitting expansion fo the spring but limiting the expansion to prevent overstressing or deformation of the spring.

The clamping engagement of the spring on the shaft is firm and steady and prevents sliding of the shaft due to vibration or bouncing of the boat hull.

Othe robjects and advantages of the invention will become apparent from the following description and accompanying drawings.

DRAWINGS

FIG. 1 is a fragmentary perspective view of a boat light embodying various features of the invention.

FIG. 2 is a sectional view along line 2—2 of FIG. 1.

FIG. 3 is a fragmentary perspective view of a boat sull with the boat light shown in FIG. 1.

DESCRIPTION OF PREFERRED EMBODIMENT

The clamp of the invention can be utilized in many applications wherein it is necessary or desirable to adjustably secure a shaft at various positions relative to some other object. In FIGS. 1 through 3 the invention is shown embodied in a boat light which is generally designated 10. The boat light includes a lens or dome 12 which is constructed of a translucent plastic or glass, and which is supported on a hollow shaft or conduit 14. A bulb and socket are conventionally located in the dome 12 and are not illustrated or further described in detail.

In accordance with the invention, clamping means are provided for selective height adjustment of the shaft 14 relative to a boat hull 16. In the disclosed construction such means comprises a mounting bracket 18 which includes an upstanding boss 20 and a mounting ear 22. Bracket 18 is secured to the boat hull 16 by screws 44 or other fastening means which extend through mounting ear 22 and into the boat hull 16. The boss 20 has an aperture or bore 24 which is co-axial with an aperture 26 in the boat hull 16 or rear deck 28 as shown in FIG. 3 and which receives the shaft 14. The boss 20 is provided with a counterbore 29 of larger diameter than bore 24. The clamping means also includes a helical coil spring 30 which is located within the counterbore 29, and which has an outturned end 32 secured in a radial aperture 34 in the boss, and a free end 36 in the form of a finger grip which is located above the boss 20.

The spring 30 is manufactured with a normal or relaxed inside diameter less than the diameter of shaft 14 whereby, when the spring and shaft are in assembled condition, the spring frictionally grips or clamps the shaft to prevent shaft movement. Axial movement of the shaft through the spring and relative to the boss is accomplished by increasing the radial dimension of the spring by grasping the finger grip 36 and applying torque to unwind the spring. Release of the finger grip 36 will result in the spring gripping or clamping the shaft 14.

When it is desired to change the height of the shaft 14, for instance, as for compliance with boat lighting regulations for storage purposes or when water skiing, etc., the clamping engagement of the spring 30 on the shaft is released by moving the finger grip 36 circumferentially about the shaft by application of torque to the grip 36 to increase the spring's radial dimension or diameter, thus permitting free relative movement of the shaft 14 through the spring 30. Release of the finger grip automatically returns the spring to its clamping engagement with the shaft. The diameter of counterbore 29 is slightly larger than the outside diameter of the spring 30 to permit sufficient increase in radial dimension to release the shaft. However, the wall 39 of counterbore 29 will limit increase in the radial dimension of the spring 30 and prevent overstressing or deformation of the spring.

As shown in FIG. 1, wires 40 run through the hollow interior 42 in the shaft 14 to facilitate connection of the bulb and socket to a power source.

The clamp of the invention can be utilized in various arrangements without the mounting bracket 18 or the boss 20. When using the clamp with a boat light, the spring 30 and counterbore 29 can be located in the boat hull 16 or rear deck 28. When the fiberglass construction is employed, both the aperture 26 and the counterbore 29 can be molded into the hull with the counterbore 29 located at one end of the aperture 26.

Various of the features of the invention are set forth in the following claims.

What is claimed is:

1. The combination of a boat light shaft, a light at the upper end of said shaft, a boat hull having an aperture for receiving said shaft, a mounting bracket fixed to said boat hull and having a bore therethrough for telescopically receiving said shaft, said bore being co-axial with said aperture in said boat hull, and a spring located within said bore and around and in engagement with said shaft, said spring normally being in clamping engagement on said shaft, said spring having a first end fixed relative to said bracket and a free end extending outwardly of said bracket and movable circumferentially of said spring to increase the radial dimension of said spring for release of said spring from said shaft.

2. The combination of a boat light shaft, a light at the upper end of said shaft, a boat hull having an aperture for receiving said shaft, a counterbore co-axial with said aperture at one end of said boat hull aperture, and a spring located within said counterbore and around said shaft, said spring normally being in clamping engagement on said shaft, said spring having a first end fixed relative to said boat hull and a free end extending outwardly of said boat hull and movable circumferentially of said spring to increase the radial dimension of said spring for release of said spring from said shaft.

3. The combination of a shaft, a boat hull having an aperture for receiving said shaft, a mounting bracket fixed to said boat hull and having a bore therethrough for telescopically receiving said shaft, said bore being co-axial with said aperture in said boat hull, and a spring located within said bore and around and in engagement with said shaft, said spring normally being in clamping engagement on said shaft, said spring having a first end fixed relative to said bracket and a free end extending outwardly of said bracket and movable circumferentially of said spring to increase the radial dimension of said spring for release of said spring from said shaft.

4. The combination of a shaft, a boat hull having an aperture for receiving said shaft, a counterbore co-axial with said aperture at one end of said boat hull aperture, and a spring located within said counterbore and around said shaft, said spring normally being in clamping engagement on said shaft, said spring having an end fixed relative to said boat hull and a free end extending outwardly of said boat hull and movable circumferentially of said spring to increase the radial dimension of said spring for release of said spring from said shaft.

References Cited

UNITED STATES PATENTS

| | | | |
|---|---|---|---|
| 1,532,206 | 4/1925 | Snow | 240—44.2 |
| 1,800,254 | 4/1931 | Holmes. | |
| 2,376,716 | 5/1945 | Odin. | |
| 3.253,136 | 5/1966 | Faul | 240—7.5 |

FOREIGN PATENTS

| | | |
|---|---|---|
| 203,509 | 6/1939 | Switzerland. |

NORTON ANSHER, Primary Examiner

R. P. GREINER, Assistant Examiner

U.S. Cl. X.R.

287—58, 126; 285—303